United States Patent [19]

King

[11] Patent Number: 4,642,885
[45] Date of Patent: Feb. 17, 1987

[54] METHOD OF ASSEMBLING A STATOR

[75] Inventor: James L. King, Holland, Mich.

[73] Assignee: General Electric Company, Fort Wayne, Ind.

[21] Appl. No.: 758,627

[22] Filed: Jul. 24, 1985

Related U.S. Application Data

[60] Division of Ser. No. 580,384, Feb. 15, 1984, Pat. No. 4,544,856, which is a continuation-in-part of Ser. No. 496,552, May 20, 1983, abandoned.

[51] Int. Cl.[4] .............................................. H02K 15/14
[52] U.S. Cl. ........................................ 29/596; 310/71
[58] Field of Search ................... 29/596, 598; 310/71, 310/42, 68 R, 68 B

[56] References Cited

U.S. PATENT DOCUMENTS

| | | | |
|---|---|---|---|
| 2,801,354 | 7/1957 | Donahoo | 310/71 |
| 2,802,958 | 8/1957 | Curley | 310/71 |
| 3,012,159 | 12/1961 | Druesedow | 310/71 |
| 3,023,332 | 2/1962 | St. Charles | 310/254 |
| 3,350,586 | 10/1967 | Otto | 310/71 |
| 3,725,707 | 4/1973 | Leimbach et al. | 310/71 |
| 3,760,339 | 9/1973 | Marshall | 339/221 |
| 3,858,067 | 12/1974 | Otto | 310/42 |
| 3,871,728 | 3/1975 | Goodman | 339/14 R |
| 3,979,615 | 9/1976 | Neff | 310/71 |
| 4,004,169 | 1/1977 | Charlton | 310/71 |
| 4,361,773 | 11/1982 | Mokrzycki | 310/71 |
| 4,390,219 | 6/1983 | Beehler | 339/14 |
| 4,476,407 | 10/1984 | Hildebrandt et al. | 310/71 |

FOREIGN PATENT DOCUMENTS 148203  11/1979  Japan ...................................... 310/71

Primary Examiner—Carl E. Hall
Attorney, Agent, or Firm—Ralph E. Krisher, Jr.

[57] ABSTRACT

In a method of assembling a stator, a casing of a terminal assembly is placed in seating relation with a circumferential surface of the stator and secured in such seating relation. Integral winding leads of the stator winding means are spanned across an outer circumferential portion of an end turn grouping of the stator winding means into engagement with electrical connector sections of terminals on the casing, and the integral winding leads are interconnected in direct terminating engagement with the electrical connector sections of the terminals, respectively. Windings carried by the stator have a pair of generally annular groupings of end turns with outer circumferential portions arranged adjacent the opposite end turn portions of the stator, and a set of integral leads of the windings extend from one of the end turn groupings beyond and in spanning relation with a part of the outer circumferential portion. A terminal assembly is disposed in seating relation on the circumferential surface of the stator and has a set of terminals with at least some of the terminals being connected in direct terminating engagement with the integral leads of the windings, respectively.

A stator and methods of assembling a stator with a terminal assembly are also disclosed.

15 Claims, 20 Drawing Figures

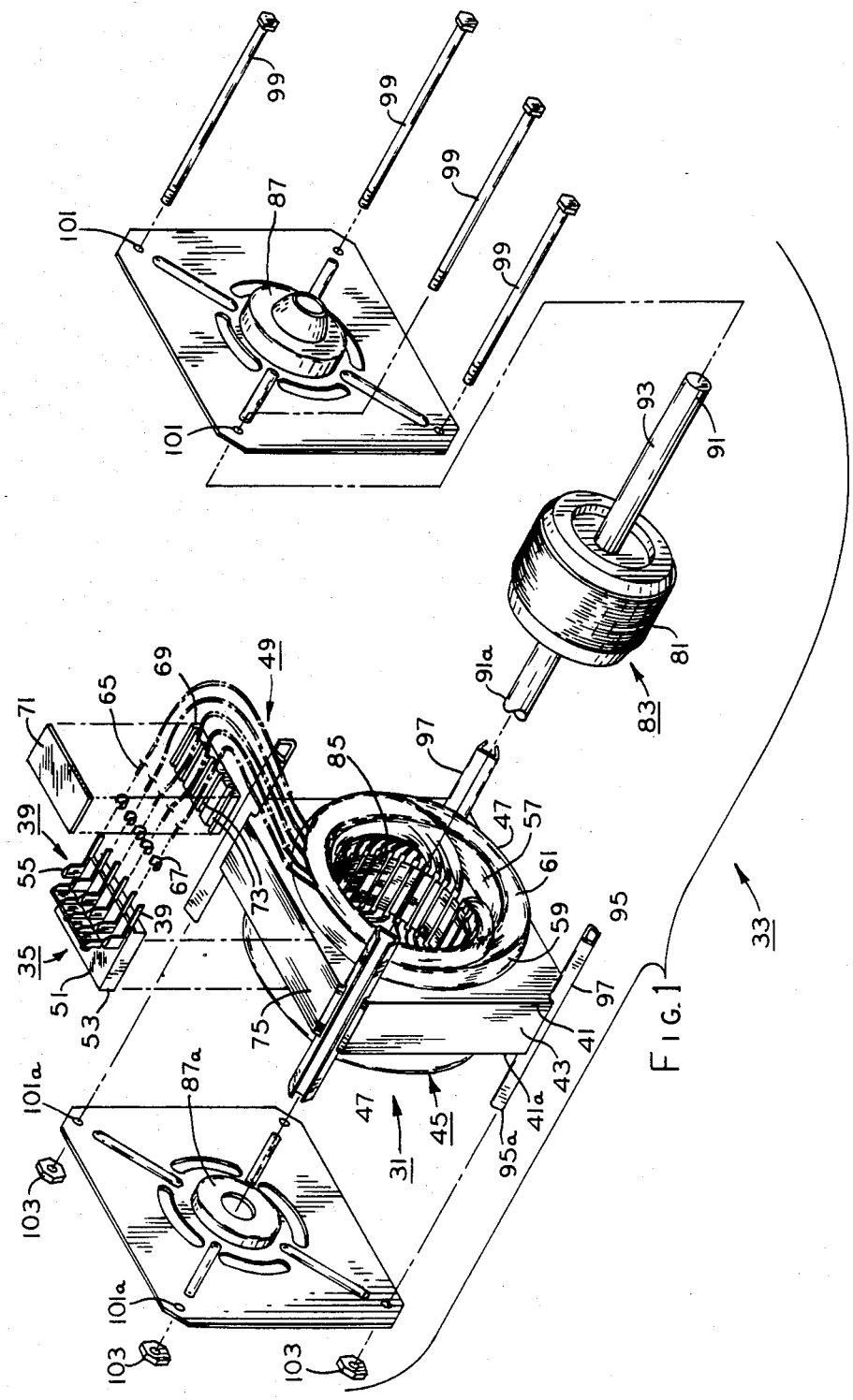

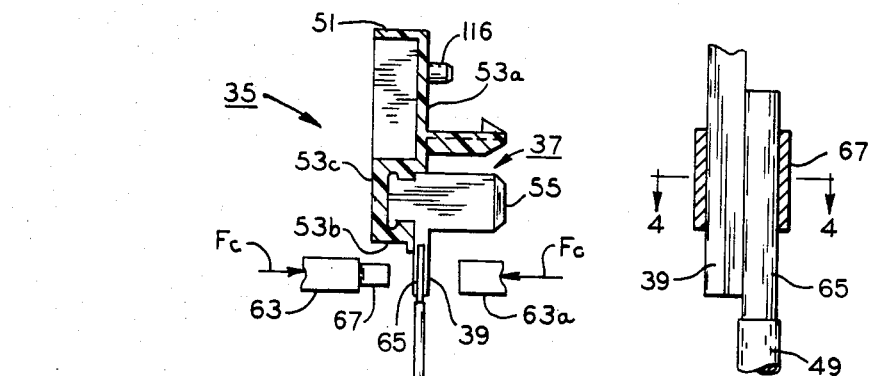
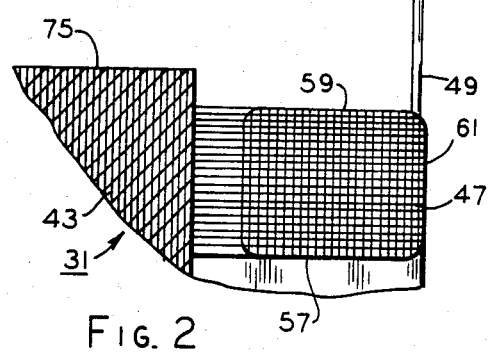
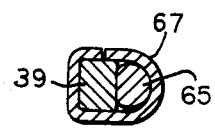
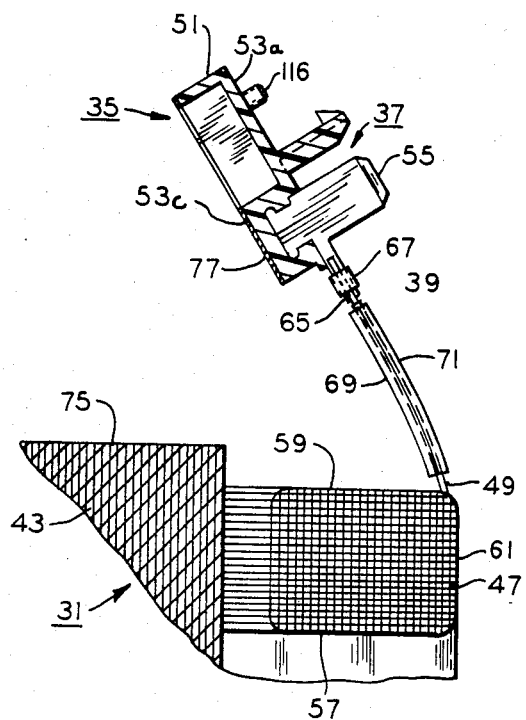

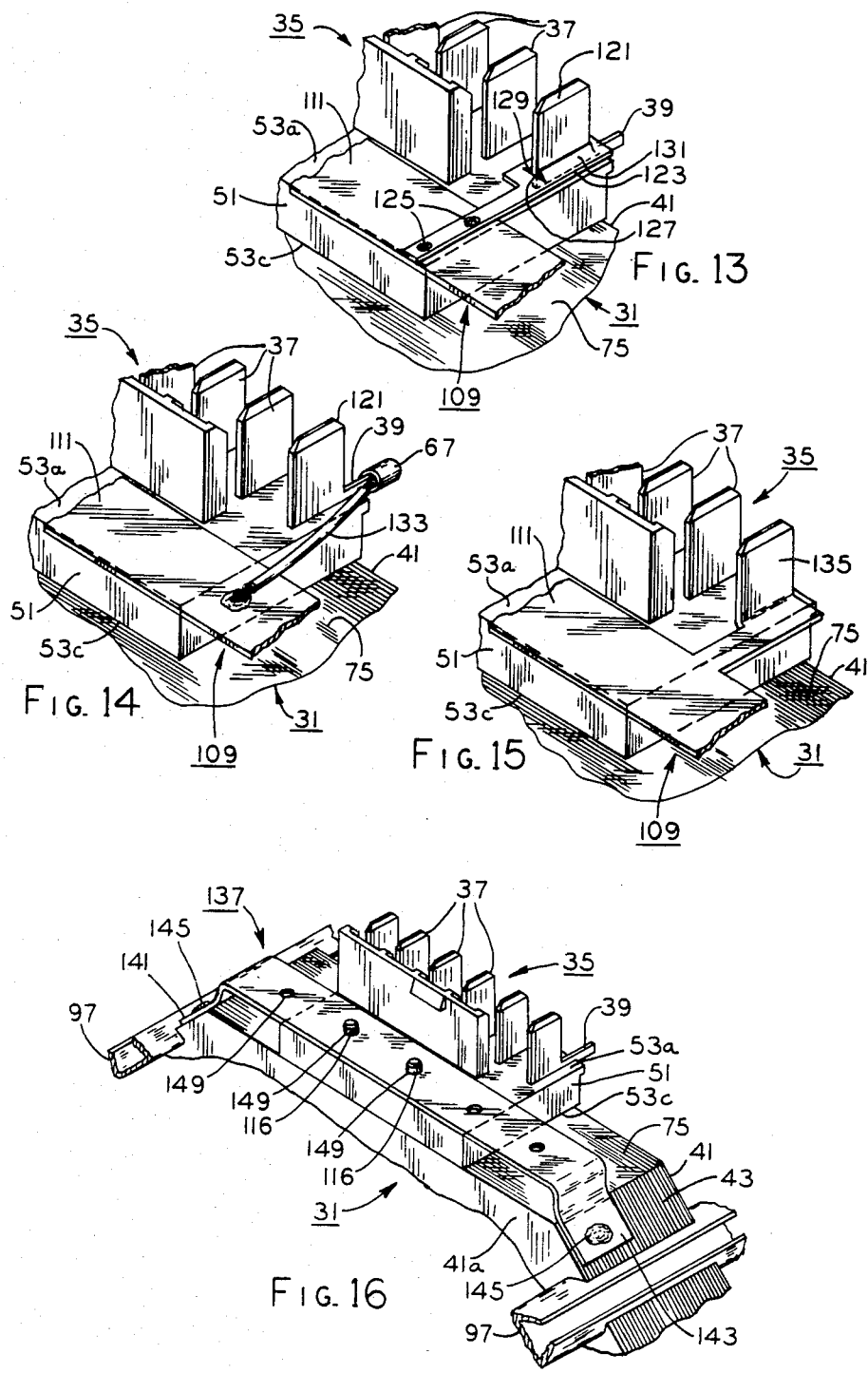

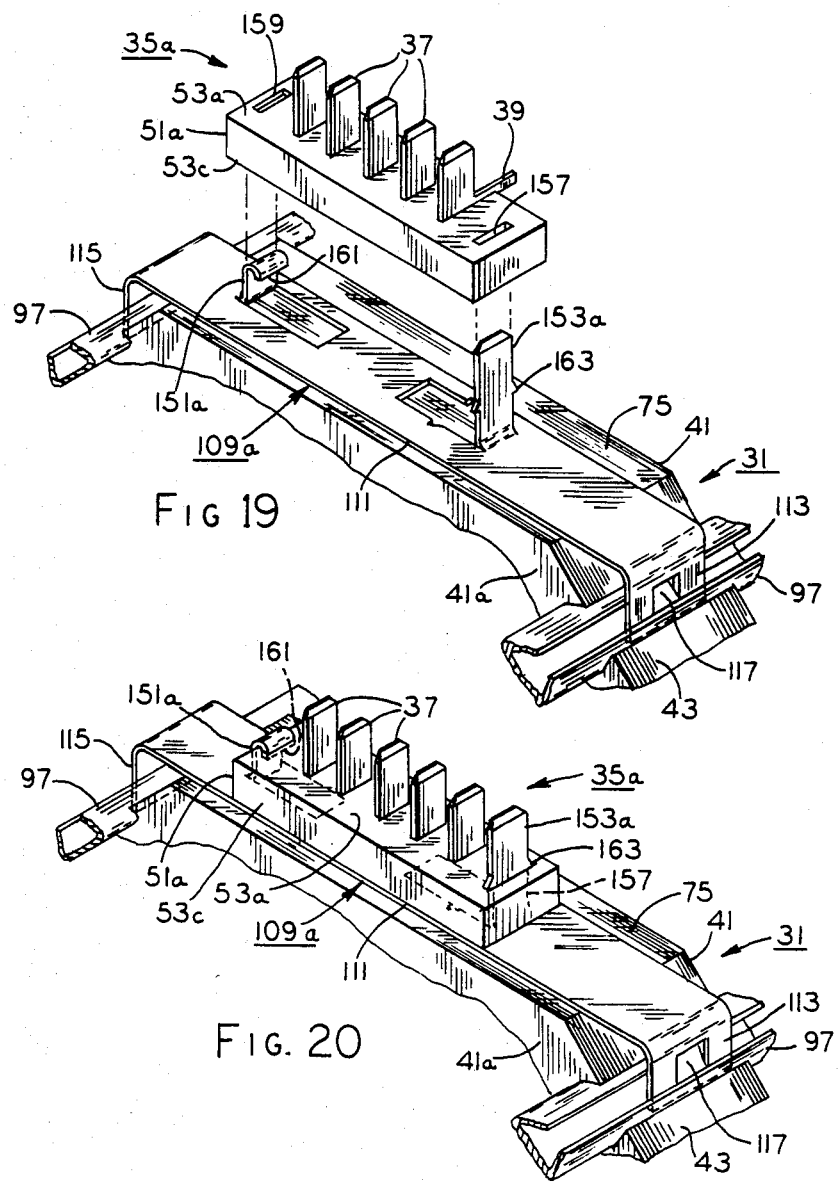

METHOD OF ASSEMBLING A STATOR

CROSS-REFERENCE TO RELATED APPLICATIONS

This application is a division of application Ser. No. 580,384 filed Feb. 15, 1984 (now U.S.. Pat. No. 4,544,856 issued Oct. 1, 1985) which was a continuation-in-part of the commonly assigned application Ser. No. 496,552 filed May 20, 1983 (now abandoned) and is related to the commonly assigned application Ser. No. 496,524 filed May 20, 1983 (now U.S. Pat. No. 4,594,773 issued June 17, 1986) with each of such aforementioned applications being incorporated herein by reference.

FIELD OF THE INVENTION

This invention relates in general to electrical apparatus and in particular to an improved dynamoelectric machine, an improved stator, improved methods of assembling a stator with a terminal assembly therefor.

BACKGROUND OF THE INVENTION

In the aforementioned application Ser. No. 496,524, split phase type motors are disclosed utilizing a switch and terminal assembly supported on an end frame of such motor and operated by a centrifugal device to control the excitation of the auxiliary and main winding of such motor. The windings of the aforementioned split phase type motors were provided with a set of integral leads extending from an end turn grouping of such windings and connected in direct terminating engagement with the terminals of the switch and terminal assembly mounted to an end frame of such motor.

In the past single or three phase type motors, many different schemes were employed to terminate the integral leads or lead ends of windings for such motors so that such integral leads could be connected with a power source for exerting such windings to effect the energization of the motor. The aforementioned windings were, of course, magnet wire encapsulated within a suitable insulating material therefor, and such magnet wire was formed into a plurality of interconnected coils thereby to comprise such windings. The coils had opposite side turns disposed in winding receiving slots of a stator and opposite end turns which were formed into generally annular groupings thereof adjacent the opposite end faces of the stator. Integral winding leads or lead ends on some of the winding coils were brought out or exited from one of the opposite end turn groupings of such coils, and as previously mentioned, it was then necessary to terminate such integral winding leads, i.e., electrically connect such integral winding leads, through some scheme or device which could conveniently be connected with a power source input power leads.

One of the most common past schemes for terminating the integral winding leads of motor windings in single or three phase motors was to merely crimp, solder or otherwise connect input power leads or lead-in conductors with the integral winding leads of the motor windings. These input power leads were respectively encapsulated within suitable insulating means, such as a cloth-like insulating material or the like, for instance, and had a crimp-type fitting or quick connect type fitting on the free end thereof which could be connected with the input power leads.

In another past terminating scheme, as shown in U.S. Pat. No. 4,004,169, crimping fittings were utilized to respectively interconnect the integral winding leads of the motor windings with input power leads, and the crimping fittings were then inserted into releasable engagement channels or openings provided therefor in an insulating holder which was mechanically mounted within the winding slots of the stator so as to extend from an end face thereof. One of the disadvantageous or undesirable features of this past terminating scheme is believed to be the lack of any convenient means for grounding the stator of the motor. Another disadvantageous or undesirable feature of this terminating scheme is believed to be that the crimping fittings might have been displaced from the channels in which they were received in the insulating holder in response to handling of the motor or in response to motor vibration effected uon the energization of the motor.

Another of the past terminating schemes, as shown in U.S. Pat. No. 3,725,707, involved mounting an insulated holder or terminal block against an end face of a stator between spaced apart end turn groupings of the windings with parts of the terminal block being gripped between such end turn groupings and stator end face thereby to retain the terminal block against displacement from the stator. Fittings were received in openings provided therefor the terminal block for releasably receiving input power leads inserted thereunto, and crimp-type connections were provided on such fittings exteriorly of such terminal blocks for interconnection with the integral winding leads of the motor winding. One of the disadvantageous or undesirable features of this past terminating scheme is believed to be that the terminal block might have been movable between the end turn groupings and stator end face in response to vibrations of the motor upon energization thereof and/or movement of the end turn groupings of the windings upon the excitation thereof. If effected, it is also believed that the aforementioned undesirable movement of the terminal block might have resulted in mechanical working causing fatigue failure at the crimped connection of the fitting with the integral lead ends of the winding.

In U.S. Pat. No. 3,979,615, a connector housing or terminal block is fixedly mounted against a stator end face by a plurality of pins, and contacts or fittings are removably insertable into openings provided therefor in the terminal block so as to releasably grip or terminate the integral winding leads of the motor winding and the input power leads associated therewith, respectively. At least one of the undesirable or disadvantageous features of this terminating scheme is believed to be that the fittings might have been dislodged from the openings in the terminal block so as to release or interrupt the termination of such fittings between the integral lead ends of the windings and the input power leads.

SUMMARY OF THE INVENTION

Among the several objects of the present invention may be noted the provision of improved methods of assembling a stator with a terminal assembly therefor which overcome the disadvantageous or undesirabe features discussed hereinabove, as well as others, with respect to the prior art; the provision of such improved methods in which a grounding circuit for the stator is conveniently achieved; the provision of such improved methods in which a terminal assembly is mounted on a circumferential surface of such stator against displacement therefrom; the provision of such improved methods in which means are provided not only for retaining the terminal assembly against displacement from the circumferential surface of the stator but also to establish a connection in ground circuit relation with the stator; the provision of such improved methods in which a set of integral winding leads of winding means associated with the stator are interconnected in direct terminating engagement with at least some of the terminals of the terminal assembly; the provision of such improved methods in which the integral winding leads of the winding means and the terminals of the terminal assembly may be interconnected in direct terminating engagement either before or after the terminal assembly is mounted to the stator; and the provision of such improved methods wherein the component parts utilized therein are simplistic in design, easily assembled and economically manufactured. These as well as other objects and advantageous features of the present invention will be in part apparent and in part pointed out hereinafter.

In general and in one form of the invention, a method is provided for assembling a stator for a dynamoelectric machine with a terminal assembly therefor having a set of terminals and at least one electrical connector section on at least some of the terminals. The stator includes a pair of opposite end faces with a circumferential surface interposed therebetween, and winding means for the stator having a pair of opposite generally annular groupings of end turns adjacent the opposite end faces of the stator with a set of integral winding leads of the winding means extending from one of the opposite end turn groupings thereof, respectively. In practicing this method, preselected ones of the integral winding leads of the winding means are interconnected in direct terminating engagement with preselected ones of the at least one electrical connector section on the at least some terminals of the terminal assembly, respectively. With the preselected ones of the at least one electrical connector section on the at least some terminals in the direct terminating engagement thereof with the preselected ones of the integral winding leads of the winding means, the terminal assembly is moved generally toward the circumferential surface of the stator adjacent one of the opposite end faces thereof, and in response to such movement, the integral winding leads are pivoted generally about the extension thereof from the one opposite end turn grouping of the winding means so as to extend the integral winding leads across at least a part of the one opposite end turn grouping of the winding means generally radially outwardly thereof and in a direction generally toward the one opposite end face of the stator. The terminal assembly is disposed in seating relation with the circumferential surface of the stator at least adjacent the one opposite end face thereof with the terminals of the terminal assembly being in spaced relation with respect to the circumferential surface of the stator, and the terminal assembly is secured in the seating relation thereof with the circumferential surface of the stator.

Also in general and in one form of the invention, a method is provided for assembling a stator for a dynamoelectric machine with a terminal assembly therefor. The terminal assembly includes a casing with a set of terminals supported therein, respectively. The stator includes a pair of opposite end faces with a circumferential surface interposed therebetween. A spring includes a deformable intermediate section interposed between a pair of opposite end portions integrally formed therewith, respectively. In practicing this method, the casing is disposed in a preselected position in seating relation with the circumferential surface of the stator with the terminals spaced therefrom. The intermediate section of the spring is arranged in overlaying relation with the casing, and a part of the intermediate section is engaged with a part of the casing. The opposite end portions of the spring are associated in releasable engagement with confronting parts on the stator at least adjacent the circumferential surface thereof, respectively, and thereby the intermediate section of the spring is deformed generally into facing engagement with the casing thereacross. The spring is stressed in response to the associating and deforming step, and thereby the casing is biased against displacement from its preselected position in the seating relation thereof with the circumferential surface of the stator.

BRIEF DESCRIPTION OF THE DRAWINGS

FIG. 1 is an exploded perspective view of a dynamoelectric machine invention and illustrates a stator thereof;

FIG. 2 is a partial sectional view showing the locations of a terminal assembly and the stator of FIG. 1 with respect to crimping jaws at a work station and illustrating principles which may be practiced in a method of assembling the terminal assembly with the stator in one form of the invention;

FIG. 3 is an enlarged partial sectional view taken from FIG. 2 illustrating a direct terminating engagement of an integral lead end of winding means on the stator and an electrical connector section on a terminal of the terminal assembly by the crimping operation of the crimping jaws of FIG. 2;

FIG. 4 is a sectional view taken along line 4—4 in FIG. 3;

FIG. 5 is an enlarged partial view illustrating the association of separating means with the integral lead ends of the winding means subsequent to the crimping as illustrated in FIG. 2;

FIG. 13 is an isometric partial view taken from FIG. 10 and showing extension means connected between a ground terminal of the terminal assembly and the spring for grounding the stator;

FIG. 14 is an isometric partial view taken from FIG. 10 and showing a conductor connected between the ground terminal of the terminal assembly and the spring for grounding the stator;

FIG. 15 is an isometric partial view taken from FIG. 10 and showing a ground terminal integral with the spring arranged in row formation with the terminals of the terminal assembly for grounding the stator in one form of the invention;

FIG. 16 is an isometric partial view taken from FIG. 10 and illustrating an alternative construction of a strap associated with the stator and the terminal assembly for retaining it in its preselected position on the stator;

FIG. 19 is an isometric partial view of an alternative construction for retaining the terminal assembly in its preselected position on the stator and for grounding the stator; and FIG. 20 is an isometric partial view taken from FIG. 19 showing the components therein in their assembly positions.

Corresponding reference characters indicate corresponding parts throughout the several views of the drawings.

The exemplifications set out herein illustrate the preferred embodiments of the invention in one form thereof, respectively, and such exemplifications are not to be construed as limiting the scope of the disclosure or the scope of the inventions in any manner.

DETAILED DESCRIPTION OF THE PREFERRED EMBODIMENTS

Figure 6:
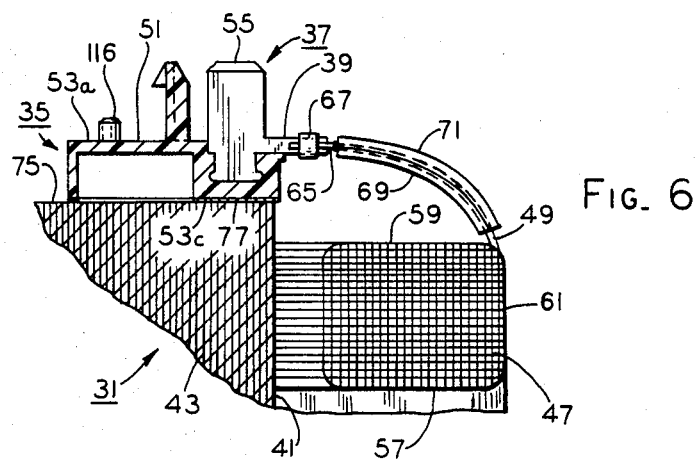
FIG. 6 is an enlarged partial view illustrating the disposition of the terminal assembly in seating relation on a circumferential surface of the stator subsequent to the association of the separating means with the integral lead ends of the winding means as illustrated in FIG. 5.
Figure 8:
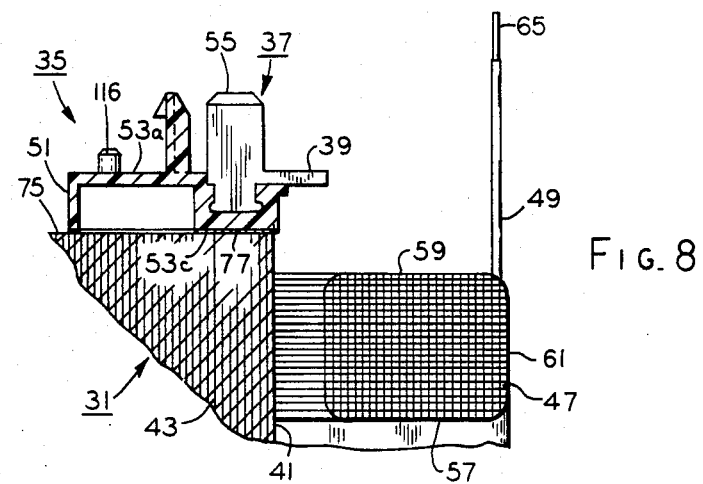
FIG. 8 is a partial sectional view showing the terminal assemoly secured to the circumferential surface of the stator prior to crimping of the terminals and the integral winding leads.
Figure 9:
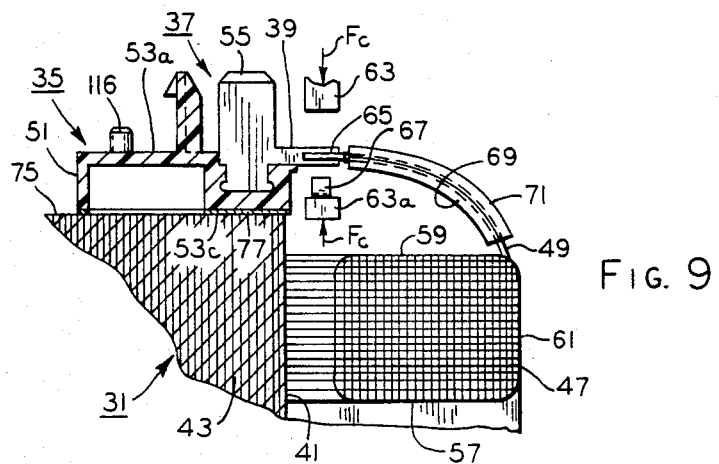
FIG. 9 is a partial sectional view showing the location of the terminal assembly with respect to the crimping jaws when the terminal assembly is seated on the circumferential surface of the stator and illustrating principles which may be practiced in an alternative method of assembling the terminal assembly with the stator in one form of the invention.

With reference to the drawings in general, there is illustrated a method in one form of the invention for assembling a stator 31 for use in a dynamoelectric machine 33 with a terminal assembly 35 therefor (FIGS. 1-10). Terminal assembly 35 has a set of terminals 37 with at least one electrical connector section or stud 39 on at least some of the terminals (FIGS. 1-3). Stator 31 includes a pair of opposite end faces 41, 41a with a circumferential surface 43 interposed therebetween, and winding or winding means 45 for the stator has a pair of opposite generally annular groupings of end turns 47, 47a adjacent the opposite end faces of the stator with a set of integral winding leads or lead ends 49 of the winding extending from one of the opposite end turn groupings 47 thereof, respectively (FIG. 1). In practicing this method, preselected ones of integral winding leads 49 of winding 45 extending from opposite end turn grouping 47 are interconnected in direct terminating engagement with preselected ones of electrical connector sections 39 on terminals 37 of terminal assembly 35, respectively (FIGS. 2-4). With the preselected ones of electrical connector sections 39 on terminals 37 in the direct terminating engagement with the preselected ones of integral winding leads 49 of winding 45, terminal assembly 35 is moved generally toward circumferential surface 43 of stator 31 adjacent one of the opposite end faces 41 thereof, and in response to such movement, and the integral winding leads of the windings are pivoted or generally rotated about the extension thereof from opposite end turn grouping 47 of the windings so as to extend the integral winding leads across at least a part of the opposite end turn grouping generally radially outwardly thereof and in a direction generally toward opposite end face 41 of the stator (FIGS. 5 and 6). Terminal assembly 35 is disposed in seating relation with circumferential surface 43 of stator 31 at least adjacent opposite end face 41 thereof, and the terminal assembly is secured in the seating relation thereof with the circumferential surface of the stator (FIG. 6).

More particularly and with specific reference to FIGS. 1 and 2, terminal assembly 35 has a casing 51 with a plurality of interconnected wall means or sides 53, and the casing may be formed of any suitable dielectric material. Terminals 37 are mounted or otherwise supported generally in row formation along a wall 53a of casing 51 with the electrical connector sections 39 of the terminals extending exteriorly of the casing beyond both wall 53a thereof and another wall 53b of the casing adjacent wall 53a thereof. Terminals 37 are also respectively provided with other electical connector sections 55 which are arranged to receive a multiple connector plug (not shown) which may be electrically associated with a power source and/or other electrical apparatus (not shown). Although terminals 37 are illustrated herein as having both electrical connector sections 39, 55, it is contemplated that at least one of the terminals may have only one of the electrical connector sections within the scope of the invention so as to meet at least some of the objects thereof.

Pairs of inner and outer circumferential portions 57, 57a and 59, 59a are provided on opposite end turn groupings 47, 47a in generally radially spaced apart relation, and a pair of opposite free end portions 61, 61a on the opposite end turn groupings extend generally between the inner and outer circumferential portions thereof, respectively. Opposite free end portions 61, 61a of opposite end turn groupings 47, 47a are predeterminately axially spaced from opposite end faces 41, 41a of stator 31, and outer circumferential portions 59, 59a of the opposite end turn groupings are predeterminately spaced radially inwardly of circumferential surface 43 of the stator. Integral winding leads 49 of winding 45 extend or are brought out of end turn grouping 47 in a grouped together or clustered relation generally at the same preselected location or area on the end turn grouping so as to protrude beyond outer circumferential surface 59 thereof. Although integral winding leads 49 of winding 45 are disclosed herein as exiting end turn grouping 47 at least adjacent its free end portion 61 so as to extend beyond outer circumferential portion 59 of the end turn grouping, it is contemplated that the integral winding leads may be brought out at any convenient location on the end turn grouping between its free end portion and opposite end face 41 of stator 31 within the scope of the invention so as to meet at least some of the objects thereof.

With integral winding leads 49 of winding 45 extending beyond outer circumferential portion 59 of opposite end turn grouping 47, as discussed above, stator 31 and terminal assembly 35 may be located by suitable fixturing (not shown) at a work station in preselected fixtured or located positions with respect to each other and with respect to a crimping device (not shown) having a set of crimping jaws or dies or the like for instance as indicated at 63, 63a in FIG. 2. Since neither the aforementioned fixtures or the crimping device form a part of this invention, details thereof are omitted for the sake of brevity of disclosure and drawing simplification. When stator 31 and terminal assembly 35 are so arranged in the preselected fixtured positions as mentioned above, a set of free ends or end portions 65 on integral winding leads 49 of winding 45 are predeterminately and conveniently disposed or positioned generally adjacent terminals 37 of the technical assembly. Thus, free ends 65 of preselected ones of integral winding leads 49 of winding 45 may be successively positioned at least adjacent preselected ones of electrical connector sections 39 on terminal 37 within or at least adjacent crimping jaws 63, 63a, and the crimping jaws may be successively actuated in response to a crimping force applied thereto, as indicated by force arrows Fc in FIG. 2, to crimp a crimping sleeve or ferrule 67 about the free ends on preselected ones of the integral winding leads of the winding and the electrical connection sections of the terminals, respectively, as best seen in FIGS. 3 and 4. Of course, during this crimping operation, the crimping engagement of crimping sleeves 67 about free ends 65 on integral winding leads 49 and electrical connection sections 39 on terminals 37 interconnect them against displacement in direct terminating engagement with each other, respectively. As discussed above, integral winding leads 49 and electrical connector sections 39 on terminals 37 are successively crimped together, and to achieve such successive crimping, at least one of crimping jaws 63, 63a, stator 31 and terminal assembly 35 in the preselected fixtured positions thereof may be indexed. However, it is contemplated that multiple crimping jaws or crimping jaws having multiple crimping recesses therein may be utilized to effect a generally simultaneous crimping of at least some and perhaps all of free ends 65 on integral winding leads 49 with electrical connector sections 39 on terminals 37 within the scope of the invention so as to meet at least some of the objects thereof. Futher, although free ends 65 of integral winding leads 49 are illustrated herein as being bared or stripped, i.e., with the winding means electrical insulation material removed therefrom, it is contemplated that crimping sleeves may be utilized which cut through or sever such electrical insulation material so as to effect the interconnection in direct terminating engagement between the integral winding leads and the electrical connector sections of the terminals thereby to obviate the need for the aforementioned baring of the free ends on the integral winding leads within the scope of the invention so as to meet at least some of the objects thereof. Instead of the above discussed crimping operation, it is also contemplated that the interconnection in direct terminating engagement between free ends 65 of integral winding leads 49 and electrical connector sections 39 on terminal 37 may be achieved by other suitable means, such as for instance soldering, brazing or welding or the like, within the scope of the invention so as to meet at least some of the objects thereof. Additionally, it is contemplated that either fewer or a greater number of integral winding leads and terminals than those illustrated herein for purposes of disclosure may be employed within the scope of the invention so as to meet at least some of the objects thereof.

Subsequent to the above discussed interconnection of integral winding leads 49 to terminals 37, stator 31 and terminal assembly 35 may be conjointly moved to another work station to effect the disposition of the terminal assembly in the seating relation thereof on circumferential surface 43 of the stator, as best seen in FIGS. 5 and 6. At this time, if desired, a device, such as a separator or insulator 69 or the like for instance, formed of any suitable material having the desired dielectric properties and resilient characteristics, such as for instance a resinous foam or the like, may be associated with the interconnected integral winding leads 49 so as to both separate them and insulate them from each other as well as opposite end turn grouping 47, as shown in FIGS. 1 and 5. A strip of tape 71 having suitable dielectric properties is adhesively secured to insulator 69 to retain integral winding leads 49 against displacement from a plurality of separating grooves 73 in the insulator for receiving the integral winding leads, respectively. Thus, when positioned in spaced relation adjacent outer circumferential portion 59 of opposite end turn grouping 47, insulator 69 not only serves to electrically insulate between the end turn grouping and the integral winding leads but also serves to dampen vibration which may be imparted to the integral winding leads upon the excitation of winding means 45 to effect energization of dynamoelectric machine 33. While insulator 69 and tape 71 are illustrated herein for purposes of disclosure, it is contemplated that such insulator and tape may be omitted or that other insulators of different materials and configurations may be employed within the scope of the invention so as to meet at least some of the objects thereof. It is also contemplated that insulator 69 and tape 71 may be associated with integral winding leads 49 as previously mentioned after terminal assembly 35 is arranged in the seating relation thereof on circumferential surface 43 of stator 31, as discussed hereinafter.

As illustrated herein for purposes of disclosure, circumferential surface 43 of stator 31 has at least one flat side or flat portion 75 thereon for seating engagement with terminal assembly 35; however, it is contemplated that the circumferential surface of the stator may have various different configurations suitable to receive the terminal assembly in seating relation within the scope of the invention so as to meet at least some of the objects thereof. To effect the seating of terminal assembly 35 on flat portion 75 of stator circumferential surface 43, the terminal assembly and integral winding leads 49 are conjointly rotated or otherwise moved generally about the preselected exiting location of the integral winding leads from end turn grouping 47 with such rotation or movement being in a direction generally toward the intersection of end face 41 of the stator with the flat portion on the circumferential surface of the stator, as best seen in FIG. 5. Thus, when another wall 53c opposite wall 53a on casing 51 of terminal assembly 35 is disposed in seating relation with flat portion 75 on circumferential surface 43 of stator 31, as best seen in FIG. 6, it may be noted that integral winding leads 49 extend generally in radially spaced relation beyond and across at least a part of outer circumferential portion 59 of end turn grouping 47. Further, although wall 53c of casing 51 is shown herein for purposes of disclosure as extending in part beyond opposite end face 41 of stator 31 so as to be generally radially spaced from a part of end turn grouping 47, it is contemplated that wall 53c of the casing may be seated in its entirety on flat portion 75 on circumferential surface 43 of the stator. Prior to the movement of terminal assembly 35 into the preselected position thereof in seating relation with flat portion 75 on circumferential surface 43 of stator 31, a hardenable adhesive material 77 may be applied onto at least one of wall 53c on casing 51 and the flat portion on the circumferential surface of the stator; therefore, upon curing the hardenable adhesive material to effect the hardening thereof, the hardenable adhesive material adheres between the casing wall and the flat portion thereby to secure the terminal assembly against displacement from its position in seating relation with the flat portion on the circumferential surface of the stator.

Figure 7:
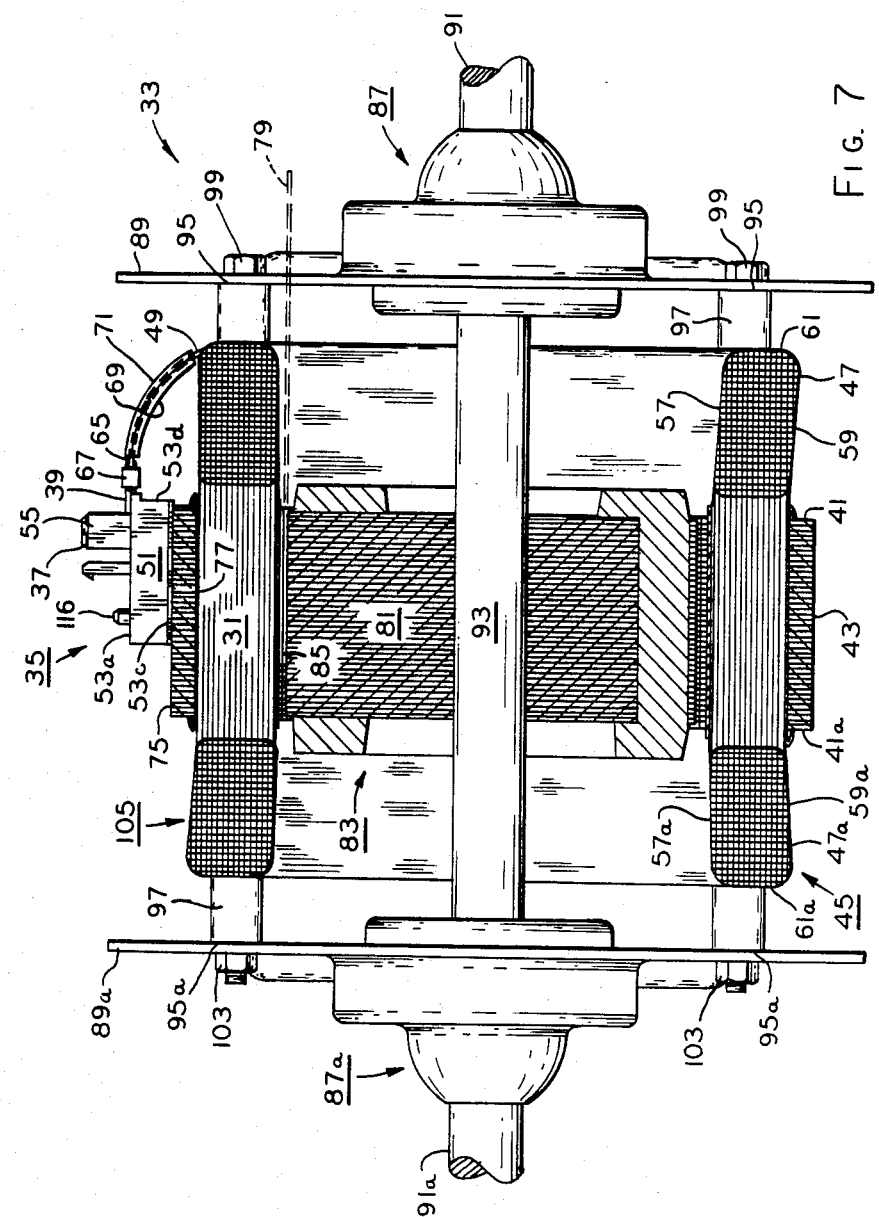
FIG. 7 is a partial sectional view of the dynamoelectric machine of FIG. 1.

Subsequent to the crimping of integral lead ends 49 of winding means 45 into direct terminating engagement with electrical connector sections 39 on terminal 37 of terminal assembly 35 and the securing of the terminal assembly in seating relation with flat portion 75 on circumferential surface 43 of stator 31, the stator may be moved into another work station for assembly with other components of dynamoelectric machine 33, as best seen in FIGS. 1 and 7. The assembly of the components of dynamoelectric machine 33 may be achieved by any suitable assembly equipment or fixturing, but for the sake of brevity of disclosure and drawing simplicity, a discussion of such assembly equipment and fixturing is omitted with the exception of a set of shims illustrated in dotted outline at 79 in FIG. 7. Shims 79 may be interposed between a rotor 81 of a rotatable assembly 83 and a bore 85 of stator 31 to establish a suitable air gap therebetween as the rotatable assembly is disposed in assembly relation with the stator. Thereafter, a pair of suitable lubrication and bearing systems, indicated generally at 87, 87a, carried on a pair of opposite end frames 89, 89a may be received in journalling and lubricating association about a pair of opposite end portions 91, 91a on a shaft 93 of rotatable assembly 83 on which rotor 81 is carried. If a more detailed discussion of lubrication and bearing systems 87, 87a is desired, reference may be had to the commonly assigned Charles W. Otto application Ser. No. 377,554 filed May 12, 1982, now U.S. Pat. No. 4,466,165 issued Aug. 21, 1984 which is incorporated herein by reference. End frames 89, 89a may be moved along shaft end portions 91, 91a toward positions located in assembly relation with a pair of sets of opposite abutment ends 95, 95a provided on a set of beams 97 associated or otherwise fixedly connected with stator 31 at least generally adjacent circumferential surface 43 thereof, and it may be noted that flat portion 75 on the circumferential surface is disposed between an adjacent pair of the beams. With end frames 89, 89a so located in assembly relation with respect to opposite abutment ends 95, 95a of beams 97, a set of through bolts 99 may be inserted through the beams and also through a pair of sets of apertures 101, 101a provided therefor in the end frames to maintain the end frames against displacement from their location in assembly location with the opposite abutment ends of the beams, respectively. Of course, a set of lock nuts 103 or the like for instance may be threadedly received on through bolts 99 in locking abutment against end frame 89a. With the above discussed component parts of dynamoelectric machine 33 so interconnected or secured together in their assembly relation or assembly positions, shim set 79 may be withdrawn through end frame 89 from the air gap establishing or shimming position thereof between stator bore 85 and rotor 81. Thus, while positioned in their assembly relation, end frames 89, 89a, stator 31 and beams 97 are secured together against displacement thereby to define a stationary assembly 105 of dynamoelectric machine 33 whereby rotatable assembly 83 is rotatable while in its assembly relation or assembly position with respect to stationary assembly 105. Further, if a more detailed discussion of the construction stator 31 and beams 97 is desired, reference may be had to U.S. Pat. No. 3,867,654 issued Feb. 18, 1975 to Charles W. Otto which is also incorporated herein by reference. Although rotatable assembly 83 and stationary assembly 105 of dynamoelectric machine 23 are illustrated herein for purposes of disclosure, it is contemplated that various other rotatable and stationary assemblies of different constructions and having component parts with different configurations associated with each other in different manners may be utilized within the scope of the invention so as to meet at least some of the objects thereof.

Figure 10:
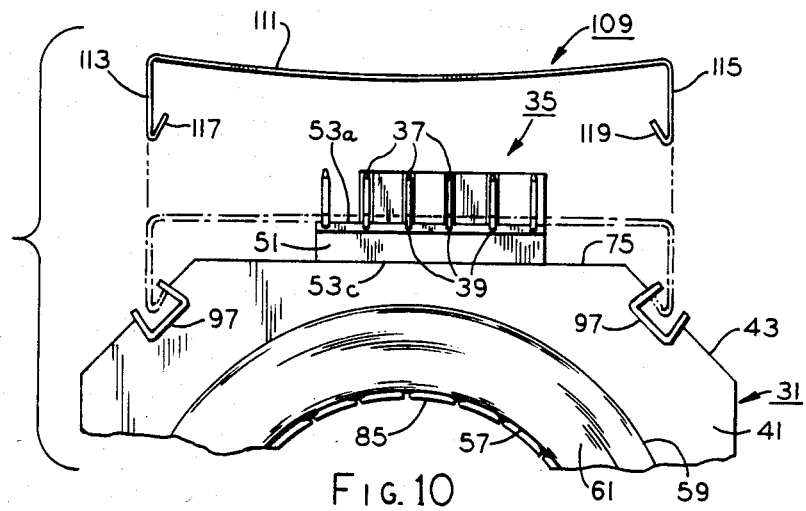
FIG. 10 is an exploded partial end view of a stator in one form of the invention and illustrating principles which may be practiced in a method of mounting a terminal assembly with a stator also in one form of the invention.
Figure 11:
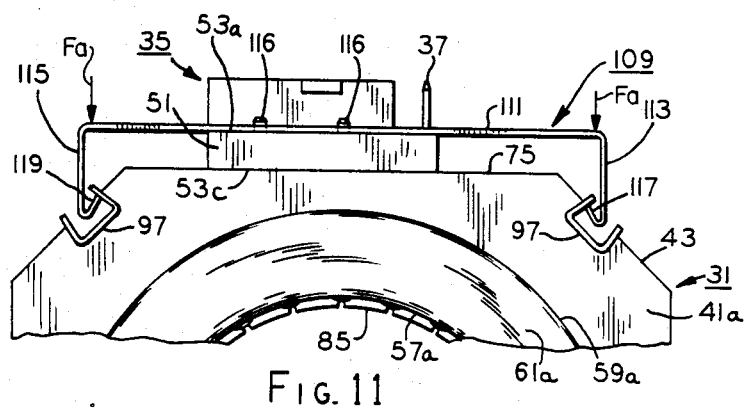
FIG. 11 is a rear elevational view taken from FIG. 10 showing a spring in assembly position.
Figure 12:
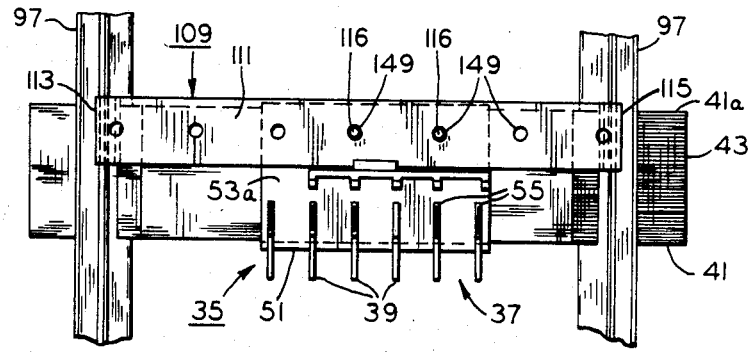
FIG. 12 is a top elevational view taken from FIG. 10 and showing the spring in assembly position.

With reference again to the drawings in general and recapitulating at least in part with respect to the foregoing, there is also illustrated in one form of the invention another method of assembling stator 31 for dynamoelectric machine 33 with terminal assembly 35 therefor (FIGS. 10-12). Terminal assembly 35 includes casing 51 with terminals 37 supported thereon, and stator 31 includes opposite end faces 41, 41a with circumferential surface 43 interposed therebetween (FIG. 1). Resilient means, such as a spring 109 or the like for instance, includes a deformable intermediate section or portion 111 interposed between a pair of opposite end portions 113, 115 depending therefrom, respectively (FIGS. 10-12). In practicing this method, casing 51 of terminal assembly 35 is disposed or placed in a preselected position in seating relation with circumferential surface 43 of stator 31 with terminals 37 spaced therefrom (FIG. 10). Intermediate section 111 of spring 109 is arranged or positioned in overlaying relation with casing 51, and a part of the intermediate section is engaged or seated on the casing (FIG. 11). Opposite end portions 113, 115 of spring 109 are associated or interconnected in releasable engagement with confronting parts on stator 31 at least adjacent circumferential surface 43 thereof, respectively, and thereby intermediate section 111 of the spring is deformed or deflected at least in part into facing relation with casing 51 thereacross (FIG. 10). In response to the association of opposite end portions 113, 115 of spring 109 with stator 31 and the deformation of intermediate section 111 of the spring, the spring is stressed, and thereby casing 51 is biased or urged against displacement from its preselected position in seating relation with circumferential surface 43 of the stator (FIGS. 10 and 12).

More particularly and with specific reference to FIGS. 10-12, when terminal assembly 35 is placed in its preselected position on stator 31, wall 53c on casing 51 of the terminal assembly is seated in abutment with flat portion 75 on circumferential surface 43 of the stator. With terminal assembly 35 in its preselected position, intermediate section 111 of spring 109 is positioned so as to extend generally across wall 53c of casing 51 with a part of the intermediate section engaging wall 53c. Thereafter, applied forces, as indicated by force arrows Fa in FIG. 11, are exerted against spring 109 at least generally adjacent opposite depending end portions 113, 115 thereof, and in response to the exertion of applied forces Fa, the depending opposite end portions are displaced into gripping or releasable engagement with confronting parts of adjacent ones of beams 97, respectively. It may be noted that opposite depending end portions 113, 115 are provided with a pair of detents or hooks 117, 119 which effect the gripping or releasable engagement with beams 97, respectively. The exertion of applied forces Fa onto opposite ends 113, 115 of spring 109 also serves to effect the deformation of intermediate section 111 thereof. Thus, in response to this deformation, intermediate section 111 of spring 109 is biased into engagement with wall 53a on casing 51 of terminal assembly 35 thereby to urge wall 53c opposite wall 53a of the casing into the seating relation thereof with flat portion 75 on circumferential surface 43 of stator 31. A pair of parts or studs 116 on wall 53a of casing 51 are received in a pair of openings 118 provided through intermediate section 111 of spring 109 thereby to comprise means for positioning engagement between the casing and the spring; however, it is contemplated that other positioning engagement means of various configurations may be utilized within the scope of the invention so as to meet at least some of the objects thereof. Further, while spring 109 is illustrated herein for purposes of disclosure generally in the form of a leaf type spring, it is contemplated that other resilient means having various other configurations may be employed within the scope of the invention so as to meet at least some of the objects thereof. It is also contemplated that crimping sleeves 67 may be crimped into engagement about integral winding leads 49 of windings 45 and electrical connector sections 39 on terminals 37 of terminal assembly 35 thereby to effect the interconnection in direct terminating engagement between the integral winding leads and the electrical connector sections either before or after the terminal assembly is secured to stator 31, as previously discussed in detail hereinbefore.

In an alternative construction when spring 109 is associated with stator 31 and terminal assembly 35, as discussed above, terminal 121 of the set of terminals 37 on casing 51 of the terminal assembly comprises a ground terminal, as best seen in FIG. 13. Means, such as an extension or abutment 123 or the like for instance, is provided for connection between intermediate section 111 of spring 109 and ground terminal 121 thereby to associate or interconnect stator 31 in ground circuit relation through the spring with the ground terminal. Extension or connecting means 123 has one end thereof secured by suitable means, such as welds 125 or the like for instance, to intermediate section 111 of spring 109, and an opening 127 is provided in the other opposite end of the extension through which ground terminal 121 protrudes. A pair of opposed flanges 129, 131 on extension 123 adjacent opposite sides of opening 127 therein are arranged in abutting or contacting engagement with ground terminal 123. While welds 125 are illustrated to secure extension 123 to spring 109 for purposes of disclosure, it is contemplated that other suitable means, such as tabs or the like for instance, may be employed to mechanically interconnect the extension and the spring within the scope of the invention so as to meet at least some of the objects thereof. It may be noted that spring 109 not only serves as a means for retaining terminal assembly 35 against displacement from its preselected position on circumferential surfaces 43 of stator 31 but also acts with extension 123 to connect the stator in ground circuit relation with ground terminal 121 of terminal assembly 35.

In another alternative construction as shown in FIG. 14, a conductor or ground wire 133 has one end thereof crimped by a crimping sleeve 67 into contacting engagement with electrical connection section 39 on ground terminal 121 of terminal assembly 35, and the other opposite end of the ground wire is connected by suitable means, such as soldering, brazing or welding or the like for instance, with intermediate section 111 of spring 109. Thus, spring 109 and ground wire 133 act to connect stator 31 in ground circuit relation with ground terminal 121 of terminal assembly 35. It is, of course, contemplated that ground wire 133 could be connected by suitable means, such as quick connect fittings or welding or the like for instance, to either spring 109 or electrical connector section 39 on ground terminal 121 of terminal assembly 35.

In another alternative construction as shown in FIG. 15, spring 109 is associated with stator 31 and terminal assembly 35 in the same manner as previously discussed; however, ground terminal 121 is omitted from terminal assembly 35a. In this alternative construction, spring 109 includes an integral ground terminal 135 lanced or otherwise displaced therefrom so as to be disposed in a preselected position generally in the row formation along wall 53a on casing 51 of terminal assembly 35. Thus, spring 109 not only defines a means for retaining terminal assembly 35 against displacement from the preselected position thereof in seating relation with flat portion 75 on circumferential surface 43 of slots 31 but also provides integral ground terminal 135 in the row formation with terminals 37 on terminal assembly 35a. It may also be noted that the interconnection of opposite end portions 113, 115 of spring 109 with stator 31 connects it in ground circuit relation through the spring with integral ground terminal 135 thereof. While integral ground terminal 135 on spring 109 is illustrated for purposes of disclosure as being arranged in the row formation with terminals 37 of terminal assembly 35a, it is contemplated that the aforementioned preselected position of integral ground terminal 135 may be displaced from the row formation of terminals 37 on terminal assembly 35a within the scope of the invention so as to meet at least some of the objects thereof.

In another alternative construction as shown in FIG. 16, the above discussed spring 109 is replaced by a metallic strap 137 as a means for retaining terminal assembly 35 against displacement from its preselected position seated on stator 31. In this alternative construction, strap 137 includes an intermediate section 139 arranged in overlaying facing relation or abutment with wall 53a on casing 51 of terminal assembly 35, and a pair of opposite ends or end portions 141, 143 integral with the intermediate section on the strap and depending therefrom are secured to circumferential surface 43 of stator 31 by suitable means, such as welds 145 or the like for instance. Posts 116 on wall 53a of casing 51 are received in positioning engagement through a pair of openings 149 in intermediate section 139 of strap 137 thereby to comprise a means for positioning engagement or abutment therebetween. While posts 116 are illustrated on casing wall 53a of terminal assembly 35 as protruding through a pair of openings 149 provided therefor in intermediate section 139 of strap 137 to effect the aforementioned positioning engagement between the strap and the terminal assembly, it is contemplated that other means may be utilized for effecting such positioning engagement between the strap and the terminal assembly within the scope of the invention so as to meet at least some of the objects thereof. Albeit not shown for purposes of brevity of disclosure and drawing simplicity, it is also contemplated that the alternative constructions illustrated in FIGS. 13-15 with respect to spring 109 may also be utilized in the same manner in connection with strap 137 of FIG. 16 to effect the ground circuit relation with stator 21 within the scope of the invention so as to meet at least some of the objects thereof. Thus, strap 13 not only may be utilized as a means for retaining terminal assembly 35 against displacement from the preseleted position thereof on stator 31 but also may act to connect the stator in the ground circuit relation as previously discussed hereinabove.

Figures 17, 18:
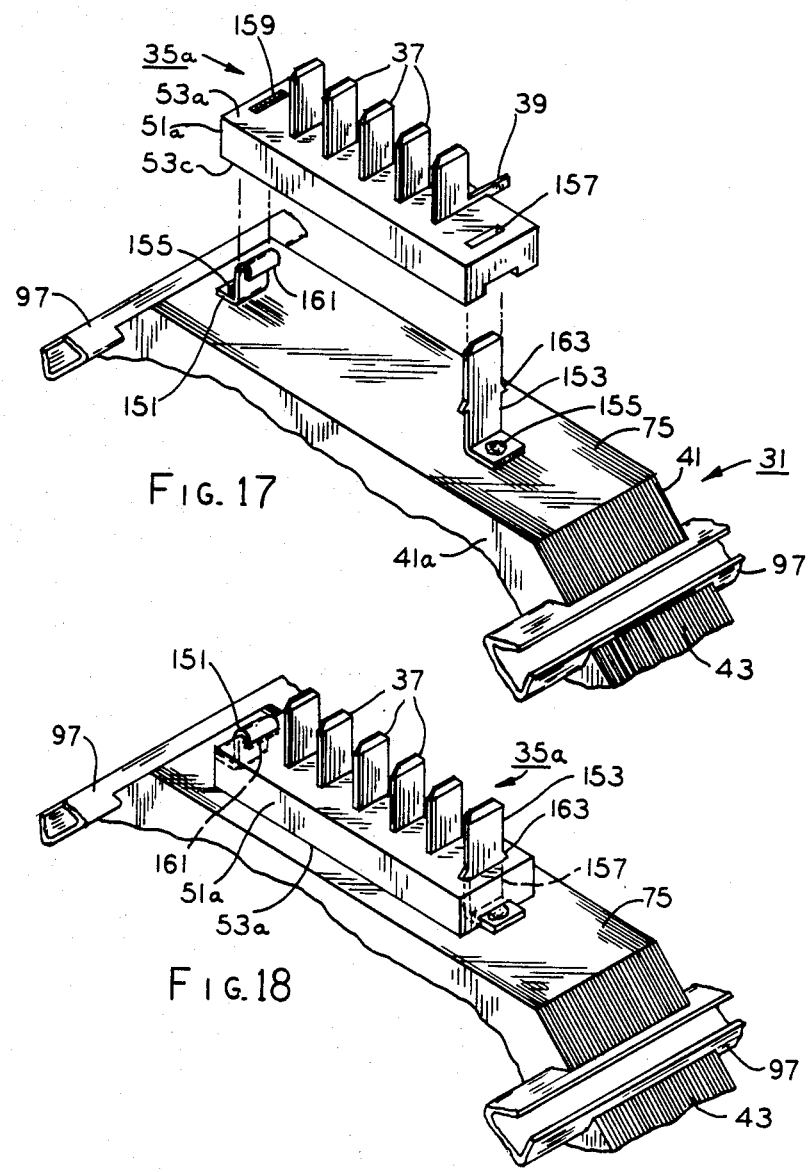
FIG. 17 is an isometric partial view of an alternative construction for retaining the terminal assembly in its preselected position on the stator and for grounding the stator.
FIG. 18 is an isometric partial view taken from FIG. 17 showing the components illustrated therein in their assembly positions.

In still another alternative construction as shown in FIGS. 17 and 18, the above discussed spring 109 and strap 137 are replaced by a spring clip 151 and a ground terminal 153 arranged in predetermined spaced apart relation and fixedly secured by suitable means, such as welds 155 or the like for instance, onto flat portion 75 on circumferential surface 43 of stator 31. The above discussed ground terminal 121 is also omitted from an alternative casing 51a of terminal assembly 35. In this alternative construction, a casing 51a of a terminal assembly 35a is provided with means, such as a slot 157 or the like for instance, intersecting with walls 53a, 53c of casing 51a for receiving ground terminal 153, and means, such as a notch 59 or the like for instance, is provided in casing 51a for receiving in releasable engagement a free end or detent 161 on spring slip 151. When terminal assembly 35a is placed in its preselected position on stator 31, ground terminal 153 extends through slot 157 in casing 51a into the row formation with terminals 37 along wall 53a of the casing, and detent 161 of spring clip 151 is disposed in notch 159 of the casing. Ground terminal 153 is provided with opposite extending means, such as for instance serrations or barbs 163 or the like, for interfering or displacement preventing engagement with casing 51a of terminal assembly 35 when the ground terminal is received in slot 157 thereof. In this manner, it may be noted that spring clip 151 and ground terminal 53 serve as means for retaining terminal assembly 35 against displacement from its preselected position in seating relation with flat portion 75 on circumferential surface 43 of stator 31, and it may also be noted that ground terminal 153 is connected directly to stator 31 in ground circuit relation therewith. While spring clip 151, ground terminal 53, and casing 51a of terminal assembly 35 are illustrated herein for purposes of disclosure, it is contemplated that other spring clips, ground terminals and casings having various other configurations and associated with each other in various different manners may be employed within the scope of the invention so as to meet at least some of the objects thereof.

In yet another alternative construction as shown in FIGS. 19 and 20, a spring 109a has generally the same component parts as previously discussed spring 109 with the exception that a spring clip 151a and a ground terminal 153a are lanced or otherwise formed from intermediate section 111 of spring 109a so as to extend therefrom and openings 118 are omitted from intermediate section 111 of spring 109a. In this alternative construction when spring 109a is associated in assembly relation or position with stator 31, hooks 117, 119 on depending end portions 113, 115 of spring 109a are arranged in gripping or releasable engagement with beams 97 on stator 31 in the same manner as previously discussed, and intermediate section 111 of spring 109a is disposed in overlaying relation or engagement with at least a part of flat portion 75 on circumferential surface 43 of stator 31. Upon the association of spring 109a in assembly relation with stator 31, spring clip 151a and ground terminal 153a extend from intermediate section 111 of the spring in a direction generally away from flat portion 75 on circumferential surface 43 of the stator so as to receive casing 51a of terminal assembly 35a. When terminal assembly 35a is placed in its preseleted position on stator 31, it may be noted that wall 53c of casing 51a is seated at least in part against intermediate section 111 of spring 109a, and ground terminal 153a on the spring extends through slot 157 in casing 51a into row formation with terminals 37 along wall 53a of the casing while detent 161 on spring clip 151a of the spring is disposed in notch 159 of the casing. Thus, barbs 163 on ground terminal 153a are disposed in interfering or displacement preventing engagement with casing 51a of terminal assembly 35a when the ground terminal is received in slot 157 thereof, and spring clip 151a is arranged in displacement preventing engagement with the casing. In this manner, it may be noted that terminal assembly 35a is carried on intermediate section 111 of spring 109a so as to be located thereby in a preselected position on flat portion 75 of circumferential surface 43 of stator 31, and it may also be noted that spring clip 151a and ground terminal 153a on spring 109a, respectively, serve as means for retaining terminal assembly 35a against displacement from its preselected position.

From the foregoing, it is now apparent that novel methods of assembling a stator with a terminal assembly therefor have been provided meeting the objects and advantageous features set out hereinbefore, as well as others, and it is contemplated that changes as to the precise arrangements, shapes, details and connections of the components utilized in such methods, as well as the precise steps and order thereof of such methods, may be made by those having ordinary skill in the art without departing from the spirit of the invention or from the scope thereof, as set out in the claims which follow.

What I claim as new and desire to secure by Letters Patent of the United States is:

1. A method of assembling a stator for a dynamoelectric machine with a terminal assembly therefor, the terminal assembly including a casing with a plurality of terminals mounted thereto, at least one electrical connector section on at least some of the terminals, and one of the terminals comprising a ground terminal, retaining means for the terminal assembly including means for grounding the ground terminal, the stator including a pair of opposite end faces with a circumferential surface interposed therebetween, at least one flat portion on the circumferential surface intersecting with one of the opposite end faces of the stator, winding means for the stator having a pair of generally annular groupings of end turns arranged generally adjacent the opposite end faces of the stator with the end turn groupings having an outer circumferential portion, and a plurality of leads integral with the winding means extending from one of the end turn groupings adjacent the one end face of the stator and at least in part beyond the outer circumferential portion thereof, the method comprising the steps of:

locating the stator and the terminal assembly in preselected located positions with respect to each other and with respect to a crimping mechanism;

positioning preselected ones of the integral leads of the winding means extending from the one end turn grouping at least generally adjacent preselected ones of the at least one electrical connector sections on the at least some terminals of the terminal assembly when the stator and the terminal assembly are located in the preselected located positions with respect to each other and with respect to the crimping mechanism and thereafter actuating the crimping mechanism to crimp the preselected ones of the integral leads of the winding means into direct terminating engagement with the preselected ones of the at least one electrical connector sections on the at least some terminals, moving at least the terminal assembly from the preselected located position thereof subsequent to actuating the crimping mechanism and extending the integral leads of the winding means in spaced relation across at least a part of the outer circumferential portion of the one opposite end turn grouping in a direction generally toward the intersection of the at least one flat portion with the one opposite end face of the stator;

arranging the casing of the terminal assembly at least in part in seating relation with the at least one flat portion at least adjacent the one opposite end face, and securing the casing in the seating relation thereof with the at least one flat portion; and associating the retaining means with the stator and the casing of the terminal assembly so as to retain the casing against displacement from the seating relation thereof with the at least one flat portion and engaging the grounding means on the retaining means with the ground terminal so as to interconnect the ground terminal in ground circuit relation with the stator during the arranging and securing step.

2. A method of assembling a stator for a dynamoelectric machine with a terminal assembly, the terminal assembly including a set of terminals mounted thereon with at least one electrical connector section on at least some of the terminals, the stator including a pair of opposite end faces with a circumferential surface interposed therebetween, winding means for the stator having a pair of opposite generally annular groupings of end turns arranged adjacent the opposite end faces of the stator and also having a set of integral winding leads extending from one of the opposite end turn groupings, the method comprising the steps of:

interconnecting preselected ones of the integral winding leads of the winding means in direct terminating engagement with preselected ones of the at least one electrical connector sections;

moving the terminal assembly with preselected ones of the at least one electrical connector sections in direct terminating engagement with preselected ones of the integral winding leads of the winding means generally toward the circumferential surface of the stator adjacent one of the opposite end faces and pivoting the integral winding leads generally from the one opposite end turn grouping of the winding means so as to extend the integral winding leads across at least a part of the one opposite end turn grouping of the winding means generally radially outwardly thereof and in a direction generally toward the one opposite end face of the stator;

disposing the terminal assembly in seating relation with the circumferential surface of the stator at least adjacent the one opposite end face, with the terminals of the terminal assembly being in spaced relation with respect to the circumferential surface of the stator, and securing the terminal assembly in the seating relation thereof with the circumferential surface of the stator; and associating the retaining means with the stator and the terminal assembly thereby to retain the terminal assembly against displacement from the seating relation thereof with the circumferential surface of the stator and to arrange the ground terminal of the retaining means in a preselected position with respect to the terminals of the terminal assembly and connecting the ground terminal in ground circuit relation with the stator upon the association therewith of the retaining means during the disposing and securing step.

3. A method of assembling a stator for a dynamoelectric machine with a terminal assembly therefor, the terminal assembly including a casing having at least a pair of opposite walls thereon, a set of terminals supported generally in row formation along one of the opposite walls of the casing with at least one electrical connector section on at least some of the terminals, respectively, the stator including a pair of opposite end faces having a circumferential surface interposed therebetween, a set of beams connected with the stator at least generally adjacent the circumferential surface thereof, and at least one flat portion on the circumferential surface of the stator between adjacent ones of the beams and intersecting with at least one of the opposite end faces of the stator, and a spring including a generally bowed intermediate section interposed between a pair of opposite end portions depending therefrom, respectively, the method comprising the steps of:

placing at least a part of the other of the opposite walls on the casing of the terminal assembly in seating relation with the at least one flat portion on the circumferential surface of the stator at least adjacent the intersection of the at least one flat portion with the at least one opposite end face of the stator;

arranging the bowed intermediate section of the spring in overlaying relation with the one opposite wall of the casing at least generally opposite the at least part of the other opposite wall of the casing in seating relation with the at least one flat portion on the circumferential surface of the stator;

moving the opposite end portions of the spring into releasable engagement with a part of the adjacent ones of the beams, respectively, and deforming thereby the bowed intermediate section of the spring generally into facing engagement with the one opposite wall of the casing; and stressing the intermediate section of the spring in response to the moving and deforming step to establish a force directed against the one opposite wall of the casing of the terminal assembly and urging thereby the at least part of the other opposite wall of the casing against displacement from the seating relation thereof with the at least one flat portion on the circumferential surface of the stator.

4. The method as set forth in claim 3 wherein one of the terminals of the terminal assembly comprises a ground terminal and wherein the moving and deforming step includes engaging a part on the deformed bowed intermediate section of the spring with the ground terminal thereby to place the ground terminal in ground circuit relation with the stator when the opposite end portions of the spring in the releasable engagements thereof with the parts of the adjacent ones of the beams, respectively.

5. The method as set forth in claim 3 wherein the spring further includes a ground terminal and wherein the moving and deforming step includes disposing the ground terminal of the spring generally in the row formation with the terminals along the one opposite wall on the casing of the terminal assembly.

6. The method as set forth in claim 3 wherein one of the terminals of the terminal assembly comprises a ground terminal and further comprising the additional step of connecting between the spring and the ground terminal a means for grounding the stator through the spring to the ground terminal.

7. The method as set forth in claim 3 wherein one of the terminals of the terminal assembly comprises a ground terminal and further comprising the preliminary step of connecting one end of a conductor to the electrical connector section of the ground terminal.

8. The method as set forth in claim 5 further comprising the additional step of securing the other end of the conductor with the spring thereby to connect the stator in ground circuit relation with the ground terminal.

9. A method of assembling a stator for a dynamoelectric machine with a terminal assembly therefor, the terminal assembly including a casing, with a set of terminals supported thereon, respectively, the stator including a pair of opposite end faces with a circumferential surface interposed therebetween, and a spring including a deformable intermediate section interposed between a pair of opposite end portions integrally formed therewith, respectively, the method comprising the steps of:

disposing the casing in a preselected position in seating relation with the circumferential surface of the stator with the terminals spaced therefrom;

arranging the intermediate section of the spring in overlaying relation with the casing, and engaging a part of the intermediate section with a part of the casing;

associating the opposite end portions of the spring in releasable engagement with confronting parts on the stator at least adjacent the circumferential surface thereof, respectively, and deforming thereby the intermediate section of the spring generally into facing relation with the casing thereacross; and stressing the spring in response to the associating and deforming step and biasing thereby the casing against displacement from its preselected position in the seating relation thereof, with the circumferential surface of the stator.

10. A method of assembling a stator for a dynamoelectric machine with a terminal assembly therefor, the terminal assembly including a casing, a set of terminals supported generally in row formation therein, and a slot in said casing, a spring including an intermediate section interposed between a pair of opposite end portions, and a clip and a ground terminal on the intermediate section, and the stator including a circumferential surface, the method comprising the steps of:

placing the intermediate section of the spring at least in part in overlaying relation with the circumferential surface of the stator and interconnecting the opposite end portions of the spring with confronting parts on the stator at least generally adjacent the circumferential surface thereof, respectively;

connecting the ground terminal in ground circuit relation with the stator through the intermediate section and the opposite end portions of the spring when the opposite end portions are interconnected with the confronting parts on the stator during the placing and interconnecting step;

disposing the casing of the terminal assembly in seating relation on the intermediate section of the spring; and passing the ground terminal into the slot in the casing generally into the row formation with the first named terminals of the terminal assembly and arranging the clip on the spring in engagement with the casing to at least oppose displacement of the casing from its seating relation with the spring as effected during the disposing step.

11. A method of assembling a stator for a dynamoelectric machine with a terminal assembly therefor, the stator including a circumferential surface, the terminal assembly including a casing having a set of terminals supported therein generally in row formation, and a slot in the casing, a ground terminal, and a clip, the method comprising the steps of:

securing the clip and the ground terminal in spaced apart relation with each other on the circumferential surface on the stator and with the ground terminal associated in ground circuit relation with the stator;

disposing the casing of the terminal assembly in seating relation with the circumferential surface on the stator and spacing thereby the terminals of the terminal assembly from the circumferential surface on the stator; and passing the ground terminal into the slot in the casing of the terminal assembly generally into the row formation with the terminals of the terminal assembly and arranging the clip in engagement with the casing of the terminal assembly so as to at least oppose displacement of the casing from its seating relation with the circumferential surface on the stator as effected during the disposing and spacing step.

12. A method of assembling a stator for a dynamoelectric machine with a terminal assembly, the terminal assembly including a casing with a plurality of terminals mounted thereto and at least one electrical connector section on at least some of the terminals, retaining means for the terminal assembly including a ground terminal, the stator including a pair of opposite end faces with a circumferential surface interposed therebetween, at least one flat portion on the circumferential surface intersecting with one of the opposite end faces of the stator, winding means for the stator having a pair of generally annular groupings of end turns arranged generally adjacent the opposite end faces of the stator with the end turn groupings having an outer circumferential portion, a plurality of leads integral with the winding means extending from one of the end turn groupings adjacent the one end face of the stator and at least in part beyond the outer circumferential portion, the method comprising the steps of:

locating the stator and the terminal assembly in preselected located positions with respect to each other and with respect to a crimping mechanism;

positioning preselected ones of the integral leads at least generally adjacent preselected ones of the at least one electrical connector sections when the stator and the terminal assembly are located in the preselected located positions with respect to each other and with respect to the crimping mechanism, and thereafter actuating the crimping mechanism to crimp the preselected ones of the integral leads into direct terminating engagement with the preselected ones of the at least one electrical connector sections;

moving at least the terminal assembly from the preselected located position thereof subsequent to the positioning and actuating step and extending the integral leads in spaced relation across at least a part of the outer circumferential portion of the one opposite end turn grouping in a direction generally toward the intersection of the at least one flat portion with the one opposite end face of the stator;

arranging the casing of the terminal assembly at least in part in seating relation with the at least one flat portion at least adjacent the one opposite end face and securing the casing in the seating relation with the at least one flat portion; and associating the retaining means with the stator and the casing of the terminal assembly thereby to retain the casing against displacement from the seating relation with the at least one flat portion and to dispose the ground terminal in a preselected position with respect to the terminals of the terminal assembly, and connecting the ground terminal in ground circuit relation with the stator upon the association therewith of the retaining means during the arranging and securing step.

13. A method of assembling a stator for a dynamoelectric machine with a terminal assembly, the terminal assembly including a casing with a plurality of terminals mounted thereto and at least one electrical connector section on at least some of the terminals, the stator including a pair of opposite end faces with a circumferential surface interposed therebetween, at least one flat portion on the circumferential surface intersecting with one of the opposite end faces of the stator, a positioning clip and a ground terminal connected in fixed relation with the at least one flat portion, winding means for the stator having a pair of generally annular groupings of end turns arranged generally adjacent the opposite end faces of the stator with the end turn groupings having an outer circumferential portion, a plurality of leads integral with the winding means extending from one of the end turn groupings adjacent the one end face of the stator and at least in part beyond the outer circumferential portion, the method comprising the steps of:

locating the stator and the terminal assembly in preselected located positions with respect to each other and with respect to a crimping mechanism;

positioning preselected ones of the integral leads at least generally adjacent preselected ones of the at least one electrical connector sections when the stator and the terminal assembly are located in the preselected located positions with respect to each other and with respect to the crimping mechanism, and thereafter actuating the crimping mechanism to crimp the preselected ones of the integral leads into direct terminating engagement with the preselected ones of the at least one electrical connector sections;

moving at least the terminal assembly from the preselected located position thereof subsequent to the positioning and actuating step and extending the integral leads of the winding means in spaced relation across at least a part of the outer circumferential portion in a direction generally toward the intersection of the at least one flat portion on the circumferential surface with the one opposite end face of the stator;

arranging the casing of the terminal assembly at least in part in seating relation with the at least one flat portion at least adjacent the one opposite end face thereof, and securing the casing in the seating relation thereof with the at least one flat portion; and interconnecting the casing of the terminal assembly with both the positioning clip and the ground terminal thereby to position the casing against displacement from the seating relation thereof with the at least one flat portion and disposing thereby the terminals of the terminal assembly and the ground terminal in preselected positions with respect to each other.

14. A method of assembling a stator for a dynamoelectric machine with a terminal assembly, the terminal assembly including a set of terminals mounted thereon with at least one electrical connector section on at least some of the terminals and with one of the terminals comprising a ground terminal, retaining means for the terminal assembly including means for grounding the ground terminal, the stator including a pair of opposite end faces with a circumferential surface interposed therebetween, winding means for the stator having a pair of opposite generally annular groupings of end turns arranged adjacent the opposite end faces of the stator and also having a set of integral winding leads extending from one of the opposite end turn groupings, the method comprising the steps of:

interconnecting preselected ones of the integral winding leads in direct terminating engagement with preselected ones of the at least one electrical connector sections;

moving the terminal assembly with the preselected ones of the at least one electrical connector sections in the direct terminating engagement thereof with the preselected ones of the integral winding leads generally toward the circumferential surface of the stator adjacent one of the opposite end faces thereof, and pivoting thereby the integral winding leads from the one opposite end turn grouping of the winding means so as to extend the integral winding leads across at least a part of the one opposite end turn grouping generally radially outwardly thereof and in a direction generally toward the one opposite end face of the stator;

disposing the terminal assembly in seating relation with the circumferential surface at least adjacent the one opposite end face with the terminals being in spaced relation with respect to the circumferential surface, and securing the terminal assembly in the seating relation with the circumferential surface; and associating the retaining means with the stator and the terminal assembly thereby to retain the terminal assembly against displacement from the seating relation with the circumferential surface, and engaging the grounding means of the retaining means with the ground terminal to interconnect the ground terminal in ground circuit relation with the stator upon the association therewith of the retaining means during the disposing and securing step.

15. A method of assembling a stator for a dynamoelectric machine with a terminal assembly, the terminal assembly including a set of terminals mounted thereon with at least one electrical connector section on at least some of the terminals, the stator including a pair of opposite end faces with a circumferential surface interposed therebetween, a positioning clip and a ground terminal connected in fixed relation with the circumferential surface, winding means for the stator having a pair of opposite generally annular groupings of end turns arranged adjacent the opposite end faces of the stator and also having a set of integral winding leads extending from one of the opposite end turn groupings, the method comprising the steps of:

interconnecting preselected ones of the integral winding leads in direct terminating engagement with preselected ones of the at least one electrical connector sections;

moving the terminal assembly with the preselected ones of the at least one electrical connector sections in the direct terminating engagement with the preselected ones of the integral winding leads generally toward the circumferential surface of the stator adjacent one of the opposite end faces thereof, and pivoting thereby the integral winding leads from the one opposite end turn grouping of the winding means so as to extend the integral winding leads across at least a part of the one opposite end turn grouping generally radially outwardly thereof and in a direction generally toward the one opposite end face of the stator;

disposing the terminal assembly in seating relation with the circumferential surface at least adjacent the one opposite end face with the terminals being in spaced relation with respect to the circumferential surface of the stator, and securing the terminal assembly in the seating relation with the circumferential surface of the stator; and engaging the terminal assembly with both the positioning clip and the ground terminal thereby to position the terminal assembly against displacement from the seating relation with the circumferential surface of the stator, and arranging the terminals of the terminal assembly and the ground terminal in preselected positions with respect to each other during the disposing and securing step.

* * * * *